United States Patent [19]

Kress et al.

[11] Patent Number: 5,785,914
[45] Date of Patent: Jul. 28, 1998

[54] PROCESS OF PRODUCING CERAMIC POLYMER COMPOSITE TOOL

[76] Inventors: Russel L. Kress, 2861 Jamestown, Rowley, Iowa 52329; H. Kent Lewis, 1901 Crescent Ave., Fort Wayne, Ind. 46805-4411

[21] Appl. No.: 561,693

[22] Filed: Nov. 22, 1995

[51] Int. Cl.[6] .................................................. B29C 33/60
[52] U.S. Cl. ........................... 264/226; 264/220; 264/225; 264/255
[58] Field of Search ..................... 264/39, 219, 220, 264/225, 226, 255

[56] References Cited

U.S. PATENT DOCUMENTS

| | | | |
|---|---|---|---|
| 3,239,590 | 3/1966 | Trimble | 264/226 |
| 4,410,642 | 10/1983 | Layton . | |
| 4,428,989 | 1/1984 | Marshall . | |
| 4,568,604 | 2/1986 | Kurtz et al. . | |
| 4,904,721 | 2/1990 | Hanaoka et al. . | |
| 4,925,611 | 5/1990 | Shockney | 264/225 |
| 5,087,405 | 2/1992 | Maker . | |
| 5,164,127 | 11/1992 | Boeckeler . | |
| 5,213,747 | 5/1993 | Lippert | 264/226 |
| 5,385,973 | 1/1995 | Maciandi et al. . | |

*Primary Examiner*—James Derrington
*Attorney, Agent, or Firm*—Brinks Hofer Gilson & Lione

[57] ABSTRACT

An improved metal working tool or die having an outer surface formed from synthetic resin material that is filled with a hardener. The outer surface is formed of a material that consists of a synthetic resin mixed with tabular alumina and a surface treating agent such as gamma-Methacryloxypropyltrimethoxysilane. The tool or die is formed over a pattern by applying the outer hard surface layer to the pattern and then a second or intermediate layer of synthetic resin that is filled with calcium silicate. A third layer of material that includes a reinforcing fiber such as fiber glass is applied over the intermediate layer.

29 Claims, 3 Drawing Sheets

PROCESS OF PRODUCING CERAMIC POLYMER COMPOSITE TOOL

BACKGROUND OF THE INVENTION

When a large number of products are to be produced on a pressworking tool, such as sheet metal dies for forming products from cold sheet metal, the tools are traditionally constructed of steel or cast iron. These tools are cast and then machined to the necessary tolerances. Such tools are also assembled from blocks that have been machined to size. Steel dies or pressworking tools have the advantage that they can be machined to very close tolerances, the surfaces are very hard and will tolerate a large number of uses before their quality diminishes to the point where their use is no longer acceptable.

Dies that are to be used for prototype tooling, for example to prove out designs rather than for large volume production are mass cast with epoxy, plaster or other similar substances. These dies have a very short production life.

When using dies for forming sheet metal a pair of dies are used. The smaller die, fits inside the larger die which is called the matrix or female die. A sheet of metal from which a product is to be formed is placed over the matrix which is mounted on the press bed. The punch or male die, which is mounted on the ram of the press, is forced down by hydraulic or mechanical pressure, and the product is formed between the dies.

In addition to pressworking tools conventional steel dies are employed for other operations such as piercing to punch holes in a sheet metal blank, blanking which is stamping out sheet metal blanks of specific shapes that are then used in other operations. Also bending and folding dies are constructed of steel to produce bends or folds in sheet material.

In the founding practice, a pattern which is a replica of the finished object is made from wood, plastic or metal. A hollow mold is then made by packing sand around the pattern and removing the pattern, finally molten metal is poured into the mold. If a small number of castings are required the pattern is usually made of varnished wood, however if a large number of castings, are required than the pattern is made from cast iron, steel, aluminum, or other metal. Foundry patterns have relative short useful lives as a result of their exposure to the abrasive sand that is packed around the patterns. Even when patterns are made from steel their life expectancy is relatively short because of the abrasiveness of the casting sand.

Steel and cast iron dies and patterns are very heavy and patterns must be handled several times for each article that is to be cast. Handling these heavy patterns is exhausting on the foundry workers, and exposes the patterns to risk as a result of mishaps during handling.

Steel tools of the type discussed above, are very difficult time consuming and expensive to produce. Also they are very heavy. As a result of their great weight the presses and other machines that utilized steel tools must be robust in order to tolerate the reciprocal movement of the heavy steel tools. The cost of producing steel tools is tremendous even for dies that have simple shapes that can be produced on automatic machines. When producing presswork dies that have complex curved surfaces that cannot be produced on automatic machines, the surfaces of the die must be hand worked which for large dies can take upward of 1,000 hours of hand labor by a skilled craftsman. As a result of the long time period required to produce such dies the lead times required before production can commence is excessive.

For the foregoing reasons, there is a need for durable metal working tools that are light in weight and can be produced easily, quickly and inexpensively.

SUMMARY OF THE INVENTION

The present invention is directed to light weight, durable metal working tools and the method of producing these tools that permits these tools to be produced easily and quickly and inexpensively.

The surface of these tools is formed of a hard ceramic polymer composite that is reinforced with fiber. This surface material is fully disclosed in U.S. patent application, Ser. No. 08/529,620, which application is by reference hereby included as a part of this disclosure. Application Ser. No. 08/529,620 discloses a resinous coating that can be applied to a mold, pattern, part, or other surface by spraying or other application and which results in a very hard surface that is very resistent to damage. In the preferred embodiment, a suitable resinous material is filled with hardener and surface modification materials which are satisfactorily dispersed in the resin matrix such that adequate fluidity is maintained to allow the resin to be sprayed onto the mold, pattern, part or other surface.

This hard ceramic polymer composite material comprises a resin mixed with tabular alumina ($Al_2O_3$) or cubic boron nitride or a carbide such as titanium carbide or silicon carbide, a coupling agent from the group consisting of silanes, titanates, and zircoaluminates in proper concentration. The resin may be selected from epoxies, polyesters, vinyl esters, and combinations of polyesters and vinyl esters. Wollastonite is added for many applications. A catalyst is introduced into the matrix and the resulting material may be sprayed or otherwise applied to the pattern before application of other composite layers.

This hard ceramic polymer surface material is backed up by an intermediate layer of filled resin and then a layer of glass fiber or other reinforcing material. Tools and dies produced with this hard surface ceramic polymer composite that is backed by a filler material and then a reinforcing material can withstand the rigors of forming sheet metal without the severely limited die life that is associated with conventional non-metal dies and tools.

The intermediate layer of filled resin which serves as a back up material for the hard surface material is a ceramic polymer composite material such as the material that is disclosed and claimed in pending U.S. Pat. No. 4,568,604 that issued on Feb. 4, 1986, which Patent is by reference hereby included as a part of this disclosure. The application of this intermediate filled layer functions to reduce air voids which can develop between the hard surface coat and the reinforcing material such as a layer of glass fiber.

The patterns used in this process can be produced by a rapid prototyping process such as Laminate Object Manufacturing or Stereo lithography. These process utilize the three dimensional ability of CAD-CAM systems to produce three dimensional objects that can function as patterns.

The new and improved process for making sheet metal forming tools and dies from the layered ceramic polymer composite materials consist of the steps of applying the hard surface ceramic polymer composite material to the surface of a pattern, preferably by a spray process. The hard surface material could also be applied by a mass cast process. A layer of the filled resin is then applied and then a layer of the reinforcing material. Depending upon the intended use for the tool additional layers of the filled resin and reinforcing material could then be applied.

The dies produced by this new and improved process can include metal inserts at extremely high wear areas to further increase their life expectancy.

It is an objective of this invention to provide light weight metal working tools that have an outer surface which is characterized by high hardness and durability.

BRIEF DESCRIPTION OF THE DRAWINGS

The drawings illustrate an embodiment of the invention for producing a set of dies for forming a sheet metal part in which.

DETAILED DESCRIPTION OF THE PREFERRED EMBODIMENT

Figure 1A:
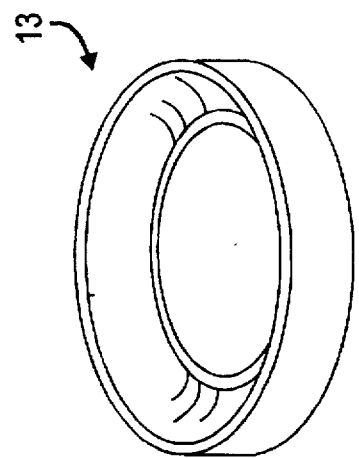
FIG. 1A is a perspective view of a metal insert.
Figure 1:
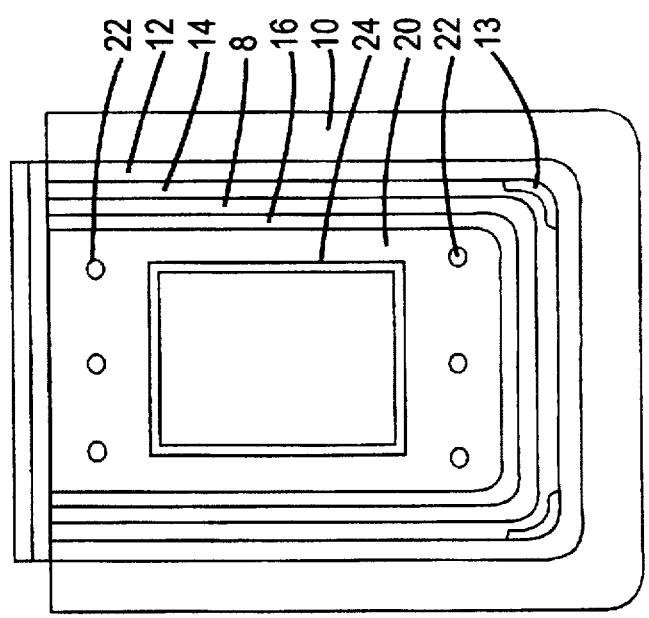
FIG. 1 is a cross sectional view of a cup shaped pattern and the layers of material and the backfill for producing the male die.
Figure 4:
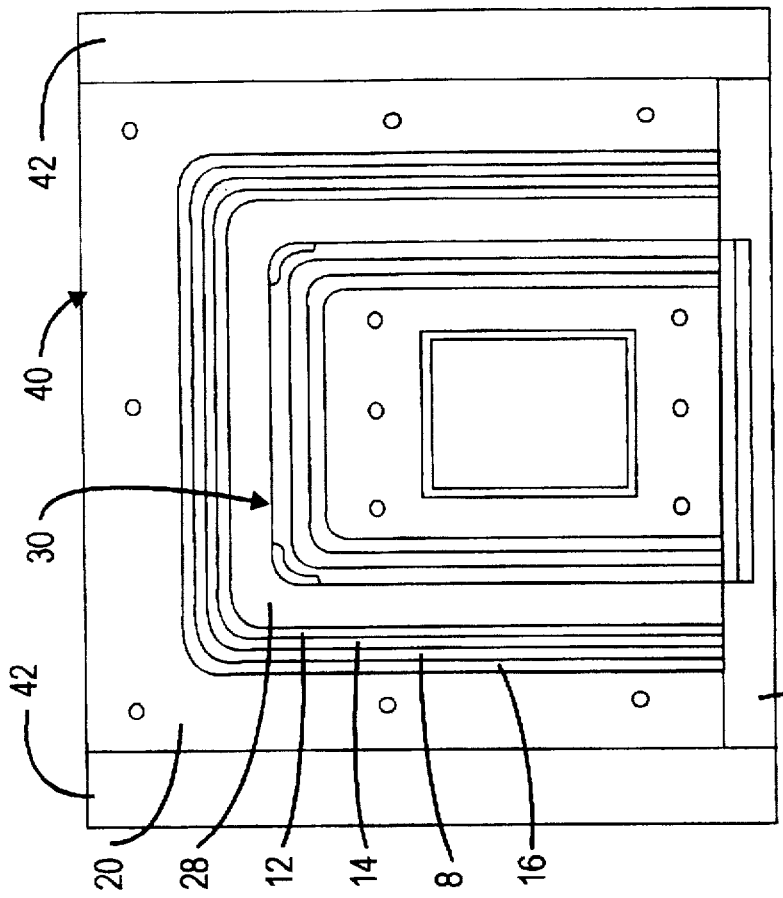
FIG. 4 is a cross sectional view of the male and female dies after the female die has been boxed up and backfilled.

A pattern 10 in the form of a cup is shown in FIG. 1. The production of a male die 30 for producing replicas of the pattern 10 will be described. A release agent 12 is first sprayed on the concave surface of the pattern 10. The purpose of the release agent is to facilitate releasing the die from the pattern.

In some areas of the die where extremely high wear is expected, such as a sharp corner where the material must be drawn around the corner, a metal insert can be positioned. FIG. 1A is an illustration of a metal insert 13 that could be utilized in the production of the male die 30 disclosed herein. The metal insert is placed along the surface of the pattern 10 and its surface that contacts the pattern surface must conform to the surface of the pattern. The metal insert should be placed directly on the release agent. In the finished die the metal insert will be included as an integral portion of the die at the extremely high wear area. Thus, the metal insert becomes the surface of the tool.

A layer of hard ceramic polymer compound 14 is sprayed over the release agent and any metal inserts that have been placed against the surface of the pattern 10. The hard surface is sprayed on to a thickness of approximately 1½ millimeters, or about 60/1000 of an inch depending upon the application.

The hard ceramic polymer compound 14 is a fiber reinforced composite product. The introduction of powdered tabular alumina (aluminum oxide) or cubic boron nitride or a carbide such as titanium carbide or silicon carbide, into a resin matrix compound along with a compound useful to treat the surface of the aluminum oxide or other material is effective in providing a curable resin compound surface coating with very high surface hardness, minimal shrinkage, and high temperature stability. A layer of this material is superior in heat resistance, water resistance, solvent resistance, corrosion resistance, friction resistance, weather resistance, and provides superior adhesion, hardness and smoothness.

In the preferred embodiment, a suitable epoxy or other curable resin is mixed with tabular alumina or cubic boron nitride or a carbide such as titanium carbide or silicon carbide, and a surface modifier (coupling agent) from the group consisting of silanes, titanates, and zircoaluminates in proper concentration. The surface modifier gamma-Methacryloxypropyltrimethoxysilane has been used due to its availability at a favorable cost. The mixture provides a flowable resin matrix which after the introduction of a catalyst and a promoting agent will provide a matrix which can be applied by spraying or other means onto a pattern. When this layer of material cures it is suitable to serve as the outer hard surface of a die or other metal working tool.

A wide range of resins are suitable for use in producing the hard surface coat that is backed up by a layer of glass fiber. Experimentation has been successful with polyester, vinyl ester, and epoxy resins. An exemplary hard surface resin has a first component comprising polyester resin, vinyl benzene and silicon dioxide (amorphous). The first component is preferably 40–70 percent by weight of the total weight of the resin, while the vinyl benzene is in the range of 30–60 percent by weight of the resin, and the silicon dioxide (amorphous) is 0–3 percent.

Generally it is not desirable for a resin filler to be dense. However, to achieve suitable hardness, a hardener which has a specific gravity in the range 3.45 to 3.70 is necessary. Aluminum oxide ($Al_2O_3$), is the preferred filler material to achieve the desired hardness. The $Al_2O_3$ is provided as tabular alumina, in powder form, with particle size in the range of 1 to 700 microns.

The surface modifier employed in the preferred embodiment composition is from the group consisting of silanes, titanates, and zircoaluminates. The preferred embodiment hard surface coat has been prepared using the surface modifier gamma-Methacryloxypropyltrimethoxysilane in a range of 0.75% to 2.00% by weight of the total mixture. The surface modifier treats the surface of the particles of $Al_2O_3$ such that the particles will adhere properly to the resin matrix.

A promoting agent such as dimethyl aniline is optionally added to accelerate the curing of the resin when the catalyst is applied. An optional extending agent such as hydraquinine may also be employed in the mixture. However, the surface modifier, promoting agent and extending agent are not essential to the invention.

The preferred embodiment composition comprises by weight the following:

TABLE II

| Component | Weight % |
| --- | --- |
| Resin | 25% ± 5% |
| gamma-Methacryloxypropyltrimethoxysilane | .75% – 2.0% |
| Tabular Alumina | 75% ± 5% |
| Wollastonite ($CaSO_3$) | .5% ± .5% |

The method for preparation of the preferred embodiment hard surface coat follows:

The gamma-Methacryloxypropyltrimethoxysilane, optional dimethyl aniline, optional extender, optional wollastonite and resin are blended thoroughly in a suitable vessel. After thorough mixing, tabular alumina or cubic boron nitride or a carbide such as titanium carbide or silicon carbide, is added to the mixture until a desired viscosity of between 5,000 centipoise and 50,000 centipoise is achieved. A resin catalyst is introduced by any of several well known means such as nozzle injection at a rate of approximately 110 percent ±0.5 percent of the rate specified for incorporation of catalyst to a resin without filler, and the resulting curing matrix is sprayed or otherwise applied to the pattern. With the preferred embodiment resin a peroxide type catalyst was selected. However, the choice of catalyst is dependent on the resin selected.

The preferred embodiment hard surface coat is capable of producing a tool or die that has an outer surface which may be used to produce parts with a class A auto finish (a/k/a "1000 Finish").

Because a range of hard surface coat resins may be employed, it is preferred that the gel time of the filled matrix be 20–25 minutes at 70°–80° F. The catalyst choice and its quantity may be adjusted to achieve the desired gel time for the filled resin.

Although the preferred embodiment hard surface coat includes wollastonite, the hard surface coat material does not require wollastonite when application of the hard surface coat is to be used with a backup coat other than the filled resin layer of the type disclosed in U.S. Pat. No. 4,568,604. When the mineral wollastonite is used in the hard surface material intermediate backup layer and the reinforcement layer, a strong mechanical bond is developed between the layers.

The hard surface coat resin may be stored in a closed container and has a shelf life of approximately ninety days. The stored product should be remixed and the appropriate catalyst added when use is desired. Alternatively, the resin and gamma-Methacryloxypropyltrimethoxysilane mixture may be stored up to ninety days and the tabular alumina or cubic boron nitride or a carbide such as titanium carbide or silicon carbide, and wollastonite introduced by mixing when the hard surface coat is ready to be applied.

An important feature of the invention is the backup material 8 that is made up of a filler and a synthetic resin. This backup material serves as an air barrier, eliminates air bubbles and also imparts superior physical properties to the die. The backup material 8 is sprayed over the hard ceramic polymer compound when the hard ceramic polymer compound is nearly completely cured.

The composition of the backup material 8 is preferably as set forth in the following table.

TABLE I

| (Backup Material) | |
| --- | --- |
| Component | Wt. % |
| Nyad G | 42.6 |
| Nyad 325 | 11 |
| Mica | 1.4 |
| Synthetic resin | 45 |

Nyad G is the mineral wollastonite having a particle size which provides 0.88 mm of surface area per gram. Nyad 325 is also wollastonite having a particular size which provides 1.55 mm of surface area per gram. The Mica is in the form of particles of about 325 mesh, and is sold under the trademark Alsimica #88. Although Mica is preferred it is not essential.

A mixture of Nyad G, Nyad 325 and mica according to the proportions of Table I is sold under the trademark "KZ" by Ceramic Technologies Corporation of Rowley, Iowa.

The components Nyad G, Nyad 325 and Mica act as a filler which provides a backup to the hard surface material, and also increases the structural strength and provides a moisture impervious layer to the die. In addition, this layer of material has a heat-dissipation property that is beneficial during curing of the synthetic resin. Other fillers, provided they have a composition of less than about 50 mesh, can be used for this purpose. For example a filler using Nyad G and Nyad 325 without the Mica could be used.

In the preferred embodiment, a suitable epoxy or other curable resin is mixed with tabular alumina or cubic boron nitride or a carbide such as titanium carbide or silicon carbide, and a surface modifier (coupling agent) from the group consisting of silanes, titanates, and zircoaluminates in proper concentration.

While the preferred composition of the backup material 8, including the synthetic resin is disclosed herein, other equivalent formulations can be used. The primary requirement of the synthetic resin is that it have the correct gel time, thixotropic properties, and cure rate. The resin preferably has a gel time of from 10 to 15 minutes, a thixotropic index of from 2 to 4 (when measured at 6 rpm and 60 rpm) and a cure rate of from 35 to 50. The stated thixotropic index is the Brookfield index, and the stated cure rate is measured with a Barcol meter with a 32 gram mass.

It is important that the solid materials (KZ) and synthetic resin be properly mixed since the preferred composition is very thick and unless it is well mixed it is difficult to spray. Apparatus for mixing and spraying this composition is disclosed in U.S. Pat. No. 4,568,604.

When the hard surface material that is disclosed in the above discussed U.S. patent application Ser. No. 08/529,620 is used as a first layer applied to the pattern with the material described in U.S. Pat. No. 4,568,604 applied as the intermediate layer between the hard outer surface and a fiber reinforced resin layer, the hard surface coat is preferably impregnated with the product sold under the Trademark "KZ" by Ceramic Technologies Corp. of Rowley, Iowa, which includes the mineral wollastonite. The use of the mineral wollastonite in both layers results in a strong mechanical bond between the layers.

It should be understood that wollastonite may be omitted from the mixture without loss of beneficial hardening effect but inclusion of the mineral is preferred.

The next layer is a reinforcement layer of glass fiber 16, preferably a polyester resin mixed with Fiberglass chop and "KZ" product that can be sprayed on by a conventional spray gun. In the preferred embodiment, the resin is either an orthophthalic or an isophthalic resin. The glass fiber chop comprises pieces of glass fiber having lengths of about one inch. After spraying this reinforcement layer on it is then rolled to eliminate any air bubbles and smooth the surface. When the intermediate layer comprises "KZ" material or other material that includes the mineral wollastonite then the reinforcing layer should be impregnated with wollastonite to increase the mechanical bonding between these layers. Reinforcing materials other than Fiberglass chop, for example steel, aluminum or titanium fibers can be used. Woven kevlar or polyester material can also be as the reinforcing material. Titanium whiskers which are a single crystal and are extremely strong can be used as a reinforcing material. The glass fiber chop or other material is rolled into the polyester resin.

Depending upon the use that the tool is to be put, another layer of the backup material 8 could be sprayed over the reinforcing layer 16 and if necessary another fiber glass layer 16 over that.

Alternate layers of KZ and reinforcing layers can be added until a thickness that is appropriate for the type of tool that is being constructed is attained. Each layer must cure before the next layer is added.

Tools having only a single set of three layers serve well for some applications. It is of course necessary to backfill such single layer tools to stabilize them. Such tools could be used for prototype work or situations where a small number of products will be produced from the tool.

Tools for prototype purposes are conventionally made from Kirksite, which is a zinc alloy having a low melting point. Kirksite can be cast and machined similar to harder materials. The prototype product could be used as the pattern and the process of this invention could be used to produce production tools to reproduce the prototype product.

After the desired layers of material have been applied to the pattern 10 the pattern is, if necessary, then boxed up so that the tool can be backfilled with a material such as concrete 20. It was not necessary to box up the male die 30 of FIG. 1 in order to backfill it. The backfill is applied after the glass fiber layer 16 has cured. Reinforcing bars 22 can be included as a part of the backfill concrete or other material. The concrete should then be sealed off with layers of ceramic polymer 8 and layers of Fiberglass 16. The surface can then be machined flat. Rather than using a solid backfill such as concrete 20, a hollow metal box structure 24 or structures could be inserted in the area to be backfilled which can materially lighten the total weight of the tool.

Figure 2:
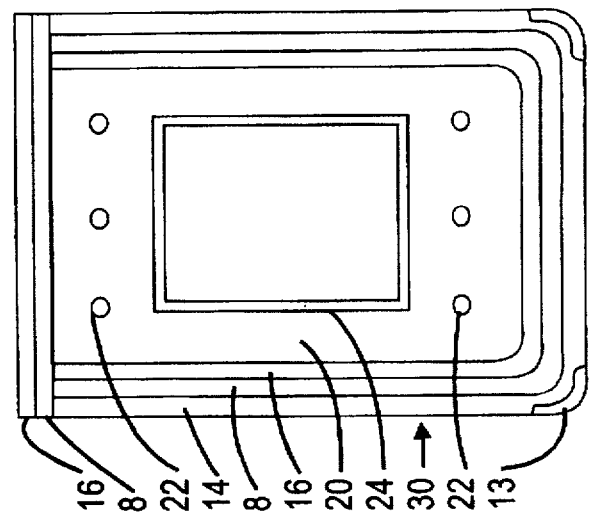
FIG. 2 is a cross sectional view of the male die after it has been removed from the cup shaped pattern.

The male die 30 or tool is then removed from the pattern 10. The release agent 12 facilitates this removal. The male die 30, after being removed from the pattern 10 is illustrated in FIG. 2. The outer surface of metal insert 13 forms a part of the outer surface of the male die 30.

Figure 3:
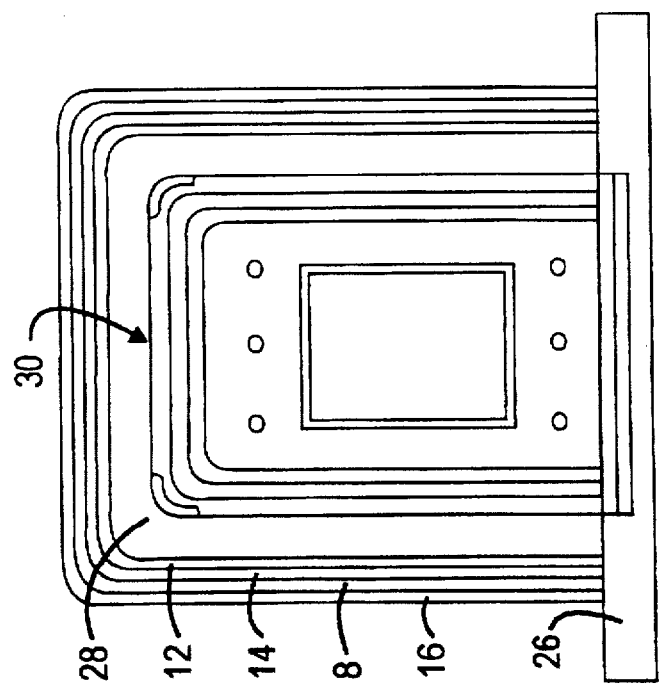
FIG. 3 is a cross sectional view of the male die being used as the pattern for producing the matrix or female die.
Figure 5:
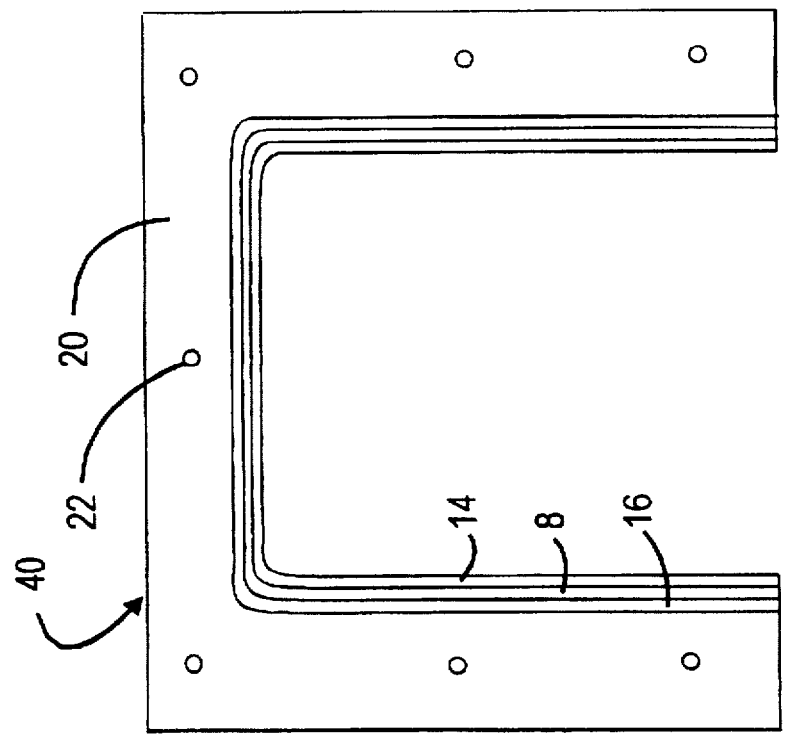
FIG. 5 is a cross sectional view of the backfilled matrix or female die after it has been removed from the pattern.

FIG. 3 is a view of the male die being used as the pattern for producing the matrix or female die 40. The male die 30 is secured to a base 26 and its outer surface is covered with a layer of sheet wax 28. The thickness of the sheet wax 28 corresponds to the thickness of the original pattern 10. A release coat is applied to the outer surface of the sheet wax 28 to facilitate removal of the female die 40. A first layer of hard ceramic polymer compound 14 is applied over the release coat 12. After the hard ceramic polymer compound 14 has cured, a second layer of backup material 8 is applied over the hard ceramic polymer compound 14 and then a third reinforcement layer 16 is applied. If the application requires, additional backup layers 8 and reinforcement layers 16 could then be applied. When a sufficient number of layers have been applied the female die 40 is boxed up, for example by boxing material 42 and the void between the boxing material 42 and the outer surface of the female die 40 is backfilled with concrete 20 or other backfill material. As with the backfill for the male die 30 reinforcing bars 22 and or hollow metal box structures 20 could be used in backfilling the female die 40. The female die is then removed from the male die 30. The female die 30 is shown in FIG. 5 after it has been removed from around the male die 30 that functioned as the pattern for the female die 40.

When a two part die set is being produced by the process of this invention and sheet wax 28 has been employed to compensate for the thickness of the finished product, the sheet wax will remain attached to the first half of the tool that is produced. This makes it unnecessary to remove the sheet wax from the second half of the two part die set.

Figure 6:
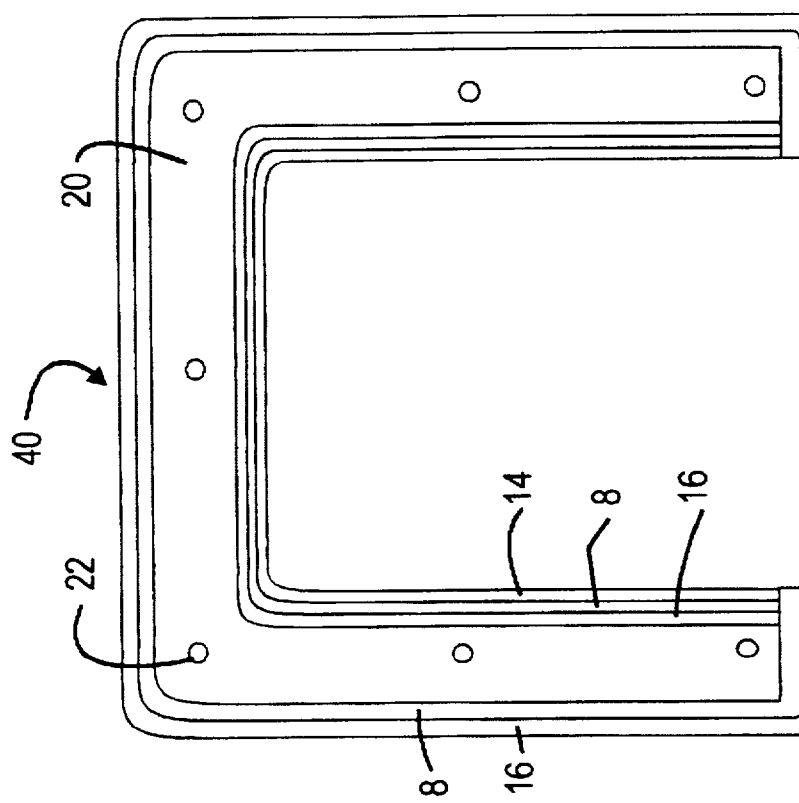
FIG. 6 is a cross sectional view of the matrix or female die after the backfill has been sealed.

After removing the matrix or female die 40 from its pattern, its outer surfaces are sealed with layers of backup material 8 and reinforcement layers of glass fiber 16 as appropriate. The sealed female die 40 is illustrated in FIG. 6.

A two part die set has been constructed, according to this invention, that includes about 600 pounds of steel reinforcing bars and weighed a total of about 6,300 pounds. If this same tool had been made in the conventional method from cast iron it would have weighed about 20,000 pounds. The lightness of tools made by this invention is a significant advantage of this invention. Since the tools are lighter they are not only easier to handle and use but the equipment needed to utilize these tools can also be lighter.

While the invention has heretofore been described in detail with particular reference to an illustrated apparatus, it is to be understood that variations, modifications and the use of equivalent mechanisms and materials can be effected without departing from the scope of this invention. It is, therefore, intended that such changes and modifications be covered by the following claims.

What is claimed is:

1. A method of making a sheet metal die comprising the steps of:
   a. providing a pattern of the object to be produced;
   b. coating a surface of the pattern with a release agent;
   c. applying a composition comprising a synthetic resin and a ceramic powder to form a first layer over the release agent;
   d. applying a composition comprising a synthetic resin and a filler to form a second layer over the first layer;
   e. applying a third layer of reinforcement material over said second layer of synthetic filled resin; and
   f. releasing the sheet metal die from the pattern.

2. The method as set forth in claim 1 wherein said second layer is compatible with said composition comprising a synthetic resin and a ceramic powder.

3. The method as set forth in claim 1 wherein said composition of said first layer and said composition of said second layer each include wollastonite.

4. The method as set forth in claim 2 wherein said ceramic powder comprises aluminum oxide in powder form and a surface treating agent.

5. The method as set forth in claim 2 wherein said synthetic resin of said first layer comprises polyester resin, styrene, and fumed silica.

6. The method as set forth in claim 4 wherein said synthetic resin of said first layer comprises approximately twenty five percent by weight of the mixture and the aluminum oxide comprises approximately seventy-five percent by weight of the mixture.

7. The method as set forth in claim 4 wherein said surface treating agent is selected from the group consisting of silanes, titanates, and zircoaluminates.

8. The method as set forth in claim 4 wherein said surface treating agent is gamma-Methacryloxypropyltrimethoxysilane.

9. The method as set forth in claim 6 wherein said aluminum oxide is ground to a particle size of from one to 700 microns.

10. The method as set forth in claim 1 wherein the synthetic resin of said first layer is a curable resin that is reactive to a catalyst and includes a surface modifying agent that modifies the surface of said ceramic powder.

11. The method as set forth in claim 10 wherein said ceramic powder has a specific gravity in the range of 3.45 to 3.7.

12. The method as set forth in claim 11 wherein said surface modifying agent is selected from the group consisting of silanes, titanates, and zircoaluminates,
   the synthetic resin of said first layer comprises approximately twenty-five percent by weight of the mixture, and
   the ceramic powder comprises approximately seventy-five percent by weight of the mixture.

13. The method as set forth in claim 12 wherein said ceramic powder comprises aluminum oxide in powdered form.

14. The method as set forth in claim 13 wherein the surface modifying agent is gamma-Methacryloxypropyltrimethoxysilane, the synthetic resin of said first layer comprises polyester resin, styrene, and fumed silica, and said aluminum oxide is ground to a particle size of from one to 700 microns.

15. The method as set forth in claim 1 wherein said ceramic powder comprises:

tabular alumina and a surface modifying agent selected from the group consisting of silanes, titanates, and zircoaluminates, and further wherein the following step is performed, after the step of applying the composition that forms said first layer:

curing the composition that forms said first layer.

16. The process of claim 15 wherein said tabular alumina is ground to a particle size of from one to 700 microns, said surface modifying agent is gamma-Methacryloxypropyltrimethoxysilane, said synthetic resin of said first layer comprises approximately twenty-five percent by weight of the mixture, and the filler comprises approximately seventy-five percent by weight of the mixture.

17. The process of claim 16 wherein the composition that forms said first layer includes a filler consisting of calcium silicate, the composition that forms said second layer of synthetic filled resin is compatible with said first layer and consists of a resin filled with calcium silicate, and said third layer of reinforcement material is a fiber reinforced resin layer, and after the first, second and third layers have been applied the following step is performed:

curing the layers.

18. The process of claim 16 wherein the calcium silicate of said first and second layers is wollastonite.

19. The process of claim 17 wherein the calcium silicate of said second layer comprises wollastonite having a first component with a primary particle size to provide a surface area of about 0.88 mm per gram and a second component having a primary particle size to provide a surface area of about 1.55 mm per gram.

20. The process of claim 1 wherein the reinforcement material of said third layer includes chopped fiber glass.

21. The process of claim 1 wherein the reinforcement material of said third layer includes steel fibers.

22. The process of claim 1 wherein the reinforcement material of said third layer includes aluminum fibers.

23. The process of claim 1 wherein the reinforcement material of said third layer includes titanium fibers.

24. The process of claim 1 wherein the reinforcement material of said third layer includes titanium whiskers.

25. The process of claim 1 wherein the following additional step is performed:

rolling said third layer of reinforcement material into the composition forming said second layer to eliminate air bubbles.

26. The process of claim 25 wherein the following additional step is performed:

backfilling the layers of material that have been applied to stabilize the die surface when in use.

27. The method as set forth in claim 2 wherein said ceramic powder comprises cubic boron nitride in powder form and a surface treating agent.

28. The method as set forth in claim 2 wherein said ceramic powder comprises titanium carbide in powder form and a surface treating agent.

29. The method as set forth in claim 2 wherein said ceramic powder comprises silicon carbide in powder form and a surface treating agent.

* * * * *

UNITED STATES PATENT AND TRADEMARK OFFICE
CERTIFICATE OF CORRECTION

PATENT NO. : 5,785,914
DATED : July 28, 1998
INVENTOR(S) : Russel L. Kress et al.

It is certified that error appears in the above-identified patent and that said Letters Patent is hereby corrected as shown below:   On the title page:

Item [54], and Column 1, line 3,
In the Title, change "COMPOSITE" to -- COMPOSITION --

In Col. 1, line 2, change "COMPOSITE" to -- COMPOSITION --

Signed and Sealed this

Seventeenth Day of October, 2000

Attest:

Q. TODD DICKINSON

*Attesting Officer*          *Director of Patents and Trademarks*